United States Patent Office 3,383,517
Patented May 14, 1968

3,383,517
PHOTOELECTRIC DETECTING APPARATUS FOR THE PASSAGE OF AN OBJECT THROUGH AN APERTURE UTILIZING THE OVERSHOOT PULSE FROM THE DETECTOR
Alan Phillipson and Basil Harry Royston Spiller, London, England, assignors to Decca Limited, London, England, a British company
Filed Dec. 4, 1964, Ser. No. 415,872
Claims priority, application Great Britain, Jan. 22, 1964, 2,829/64; Mar. 31, 1964, 13,202/64; May 12, 1964, 19,787/64
6 Claims. (Cl. 250—221)

ABSTRACT OF THE DISCLOSURE

An apparatus for detecting the passage of articles of any shape falling randomly through an aperture. Facing each other across the aperture are two plane reflectors and a light beam is caused to traverse the aperture by successive reflections from the reflectors, the beam being directed in the plane of the aperture and inclined to the reflectors at an angle at least as great as the angle whose tangent is twice the separation of the reflectors divided by the beam width. A photoelectric detector is disposed to detect the beam of light after the beam has traversed the aperture. This arrangement ensures that a continuous output pulse is produced provided that some part of the object is in the plane of the aperture. The detector produces a final overshoot pulse as the object finally leaves the plane of the aperture. A detecting arrangement differentiates, limits and then integrates the output of the detector such that the final integrated output attains a predetermined threshold output only in response to the final overshoot pulse. A trigger device is arranged to produce a single pulse output when the integrated output attains the aforementioned threshold value. In this way a single output pulse only is provided for each object falling through the aperture and undesirable effects such as double-counting are substantially eliminated.

---

This invention relates to photo-electric detecting devices.

According to one aspect of the invention, there is provided a photo-electric device for detecting the passage of an object through an aperture which device comprises a pair of flat reflectors facing each other across the aperture and fixed in parallel planes at right angles to the plane of the aperture, means for producing a beam of light in the plane of the aperture and inclined to the reflectors at an angle at least as great as the angle whose tangent is twice the separation of the reflectors divided by the beam width, and a photo-electric detector for detecting the beam of light after traversing substantially the whole of the aperture by reflections at the reflectors. With this angle of inclination of the beam to the reflectors, the axis of the beam is displaced by not more than the width of the beam between successive reflections at one reflector. Every point within the area traversed by the beam between its first and last reflections at the reflectors is covered twice by the beam. If an object interrupts different parts of the width of the beam at the two interruptions, the reduction of the amount of light reaching the detector will be greater than if the object cuts the beam only once.

The device preferably comprises circuit means responsive to the output of the photo-electric detector for producing control signals and a delivery unit for delivering objects through the aperture which unit is controlled by said control signals. The exact position in the aperture to which the delivery unit delivers the object is immaterial since the whole area between the reflectors and between the beam producing means and the detector is traversed by the beam. The delivery unit does not therefore have to be set up accurately relative to the aperture.

According to another aspect of the invention there is provided a photo-electric device comprising means for producing a beam of light traversing the aperture, a photo-electric detector for detecting the beam of light after traversing the aperture, means for differentiating the output of the detector, means for limiting the differentiated detector output, means for integrating the limited signal and means responsive to the integrated signal.

The response of the device to the transient variations in the light reaching the detector is improved by including a Schmitt trigger circuit in the output circuit of the detector.

A velocity measurement device can be made by arranging a plurality of devices as described above at spaced locations with their apertures along the path of an object with time measuring means responsive to the outputs from the detectors of the devices.

The collimated light beam producing means may comprise a laser, or a self-contained beta-ray irradiated phosphor.

Embodiments of the invention will now be described by way of example with reference to the accompanying drawings, in which:

FIGURE 3 is a block diagram of velocity measuring apparatus of the invention.

Figure 1:
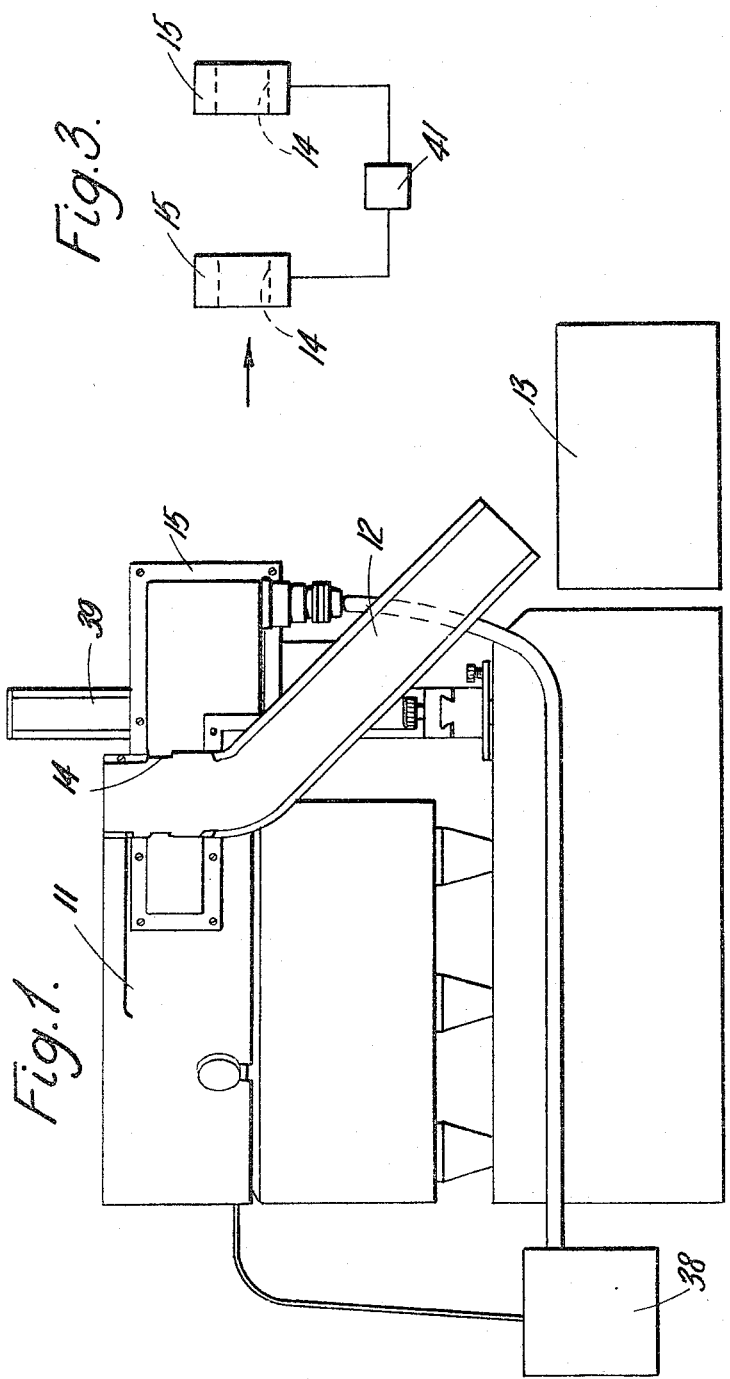
FIGURE 1 is a front elevation of seed counting apparatus.

Referring to the drawings, a bowl feeder 11 feeds seeds down a chute 12 to a container 13. The walls of the chute 12 near its top end are formed by the sides of an aperture 14 in a detecting device 15.

The detecting device 15 has a rhombus-shaped aperture 14, of two inch sides, two opposite sides of which rhombus are formed by parallel plane mirrors 16, 17 whose aluminised reflecting surfaces face each other across the aperture 14. The other sides of the rhombus are formed by opaque surfaces 18. Behind one mirror 16 is a lamp 19 with a straight line filament 21, a plano-cylindrical lens 22 and a cylindrical mirror 23. The lamp filament 21 is parallel to the plane of the aperture 14 and the lens 22 and mirror 23 are arranged on a line normal to the opaque sides 18 of the aperture. The axis of the cylindrical mirror 23 is parallel to the plane of the aperture and inclined at 45° to the opaque sides 18.

Behind the other mirror 17 is a second cylindrical mirror 24 diametrically opposite the first mirror 23, the axes of the two cylindrical mirrors being crossed. A lens system 25 and a photo-transistor 26 are arranged along the beam reflected from the mirror 24. The plane mirrors 16, 17 have clear transmitting portions 27 0.4 inch wide adjacent the cylindrical mirrors.

Light from the lamp 19 is approximately collimated by the lens 22 and the cylindrical mirror 23 and passed through the clear portion 27 of the plane mirror 16 parallel to the opaque sides 18. The beam width and divergence are controlled by the widths and locations of the clear portion 27 and cylindrical mirror 23. The beam is reflected by the second plane mirror 17 back to the first mirror 16. When the beam reaches the first mirror 16 after passing across the aperture 14 and back again it is displaced from its original position at the mirror 16 by one beam width, due to the inclination of the plane mirrors 16, 17 to the opaque sides 18. After repeated reflections at the plane mirrors 16, 17 the beam passes through the clear portion 27 of the second plane mirror 17 onto the second cylindrical mirror 24 and is reflected and converged onto the photo-transistor 26.

The shaping of the rhombus so that the displacement of the beam is one beam width between successive reflections from one mirror ensures that every point in the aperture covered by the beam between its first reflection at the second mirror 17 and its last reflection at the first mirror 16 is covered by the beam twice. The angle of the rhombus for this condition is Tan$^{-1}$ (Twice the plane mirror separation divided by the beam width). If the angles of the rhombus approach right angles more nearly than this angle, the beam may cover points within the aperture more than twice. The aperture outside the area covered at least twice by the beam may be blanked off to force seeds to pass within the area.

The beam is not completely collimated by the lens and mirror, but is provided with a slight divergence (up to 3°). This divergence ensures that the beam crosses the aperture and reaches the photo-transistor as required although the lenses and mirrors are not exactly set up. A strictly collimated beam would require strict accuracy in the manufacture and setting up of the lenses and mirrors.

The advantage of covering every point in an area at least twice by inclined beams is that the chance of detecting an object with a dimension smaller than the beam width is increased. If a flat object, such as a disc, cuts one beam with its main plane parallel to the line of travel of the beam, the object will not cut off much of the beam. When its cuts two inclined beams, it cannot be parallel to the lines of travel of both beams, so that the reduction in amplitude at the photo-transistor 26 is more marked than if only one beam were cut. When an object cuts two beams, it is possible that it will cut one side of one beam and the other side of the other beam, so that light from both sides of the beam arriving at the second mirror clear portion will be cut off, so that the reduction in amplitude at the photo-transistor is more marked than if only one side of the beam were cut off.

Figure 4:
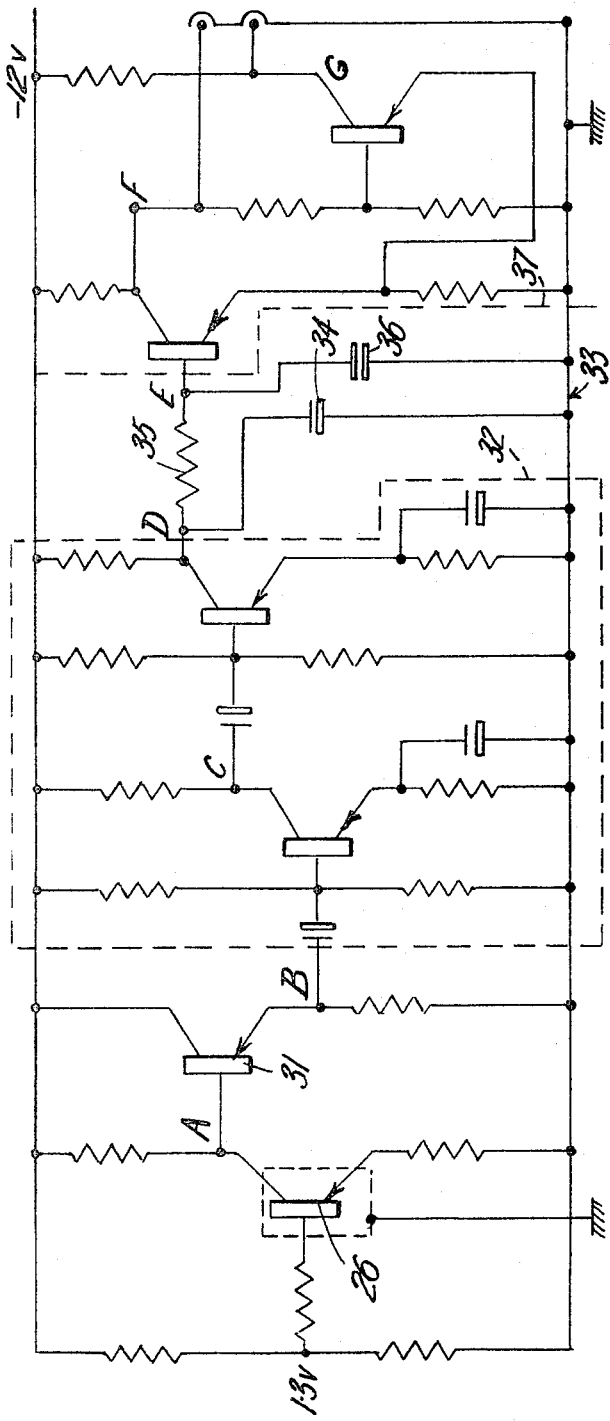
FIGURE 4 is a circuit diagram of and FIGURE 5 shows waveforms in the output circuit of the detecting device of FIGURE 2.

As shown in FIGURE 4 the photo-transistor 26 is connected through an emitter follower 31 to a two stage R-C amplifier 32. The output from the amplifier 32 is fed through a π smoothing network 33 having a 1 microfarad capacitor 34 in its first leg, a 33 kilohm resistor 35 in its cross arm and a 0.04 microfarad high voltage capacitor 36 in its second leg. The output from the smoothing network 33 is fed to a Schmitt trigger circuit 37 and the trigger circuit output is applied to a counter 38 (FIGURE 1). The counter 38 is pre-set to the number of seeds required in the container 13. The counter 38 operates the bowl feeder 11 at high speed so that seeds are fed down the chute 12 to the container 13. When the counter 38 registers a number a few (say five) below the pre-set number, the counter changes the bowl feeder 11 to low speed operation. As soon as the pre-set number is registered on the counter 38, the feeder 11 is stopped. The final low speed counting usually avoids additional seeds being dropped down the chute 12 between the time the pre-set number is registered and the bowl feeder 11 stops operating.

The bowl feeder 11 and detecting device 15 are adjustably mounted on a stand 39 so that containers 13 of different heights may be used.

The operation of the circuit of FIGURE 4 is as follows. When the light falling on the photo-transistor 26 is reduced by an object obstructing the beam across the aperture, a negative-going pulse is applied through the emitter follower 31 to the capacitor 41 in the input circuit of the amplifier 32. The length and shape of the pulse depends on the size and shape of the object; a solid object such as a seed or a ball bearing produces a plain pulse 51 (see FIGURE 5) whereas a hollow ring produces a pulse 52 with a small dip 53 of reduced amplitude in the middle corresponding to the passage of light through the centre of the ring. The photo-transistor pulse has a small overshoot 54.

In the amplifier 32 the pulses are differentiated by the CR input circuits 42. The output of the second stage is connected to earth by the first capacitor 34 of the smoothing network 33 making the second stage a limiter so that the resultant waveform includes an initial pulse 55 and a final pulse 56 which are limited and negative-going, corresponding to the initial rise and overshoot return of the photo-transistor output pulse, and an intermediate larger positive-going wave 57 corresponding to the fall of the main photo-transistor output pulse.

The smoothing circuit 33 integrates the output from the amplifier 32 to produce a small initial step 58 due to the initial pulse followed by a final larger pulse 59 due to the return of the positive-going wave. The Schmitt trigger circuit 37 is triggered by the step 58 or the final pulse 59. The trigger circuit 37 is not triggered twice, since the final pulse 59 occurs before the trigger circuit has finished its firing operation when triggered by the initial pulse 58. The firing operation is of milliseconds duration.

The smoothing circuit 33 removes the noise from the amplifier output, so that the trigger circuit 37 cannot be triggered by spurious signals.

Figure 5:
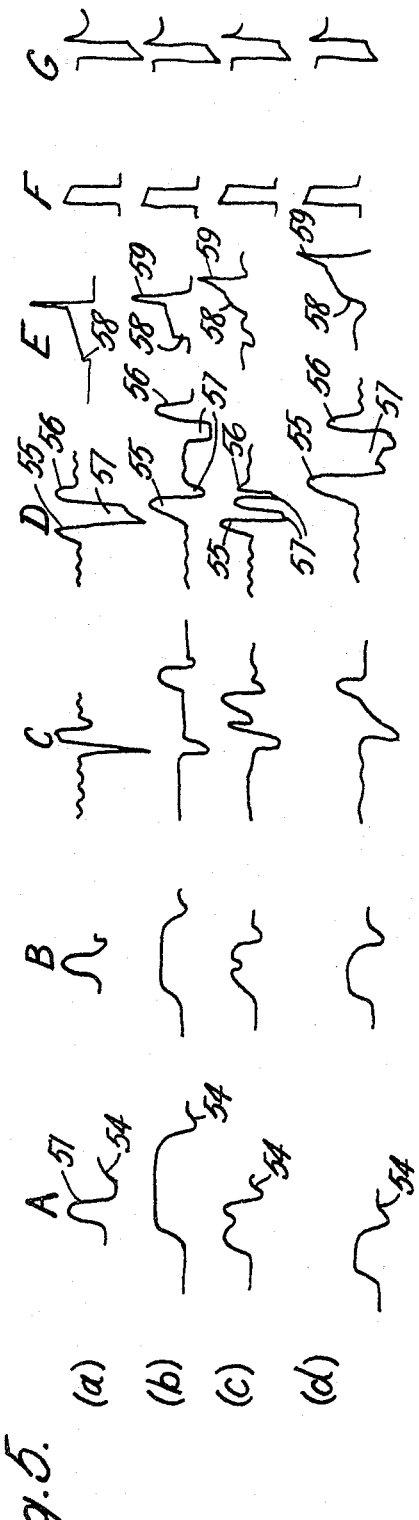

FIGURE 5 shows the waveforms at points A, B, C, D, E, F and G in the circuit of FIGURE 4 for four obstructions of the light beam. The waveforms (a) are for a small spherical object (b) for a large flat object (c) a ring presented substantially parallel to the plane mirrors and (d) the ring of (c) presented substantially normally to the plane mirrors. For all four cases the waveforms at E, F and G are similar, the initial step 58 and final pulse 59 of the waveform at E being derived from the initial rise and final fall of the transistor output pulse, the shape of the transistor output pulse intermediately being of little effect.

We have found that the detector and its output circuit will count objects up to a rate of 75 per second. The sensitivity of the detector is adjusted by varying the intensity of the light beam reflected across the aperture. The sensitivity is adjusted so that, for example, unwanted objects such as specks of dirt and fluff are not counted while wanted objects such as seeds are counted. However if objects the size of specks of dirt are required to be counted, the sensitivity is increased by raising the intensity of the beam. When very large objects are being counted the sensitivity is reduced so that, although the waveform at E is of long duration, the waveform does not contain a step 58 of sufficient amplitude to fire the trigger circuit 37 in time for the final pulse 59 to fire the trigger circuit a second time.

In applications where no convenient power supplies are available for an electric lamp, a self contained beta-ray source irradiating a phosphor may be used, for example a sealed envelope filled with tritium gas with phosphor coated on the inner surface of the sealed envelope. As the light emitted from such a source is of less amplitude than that from a filament lamp, a more sensitive detector would be required.

Figure 2:
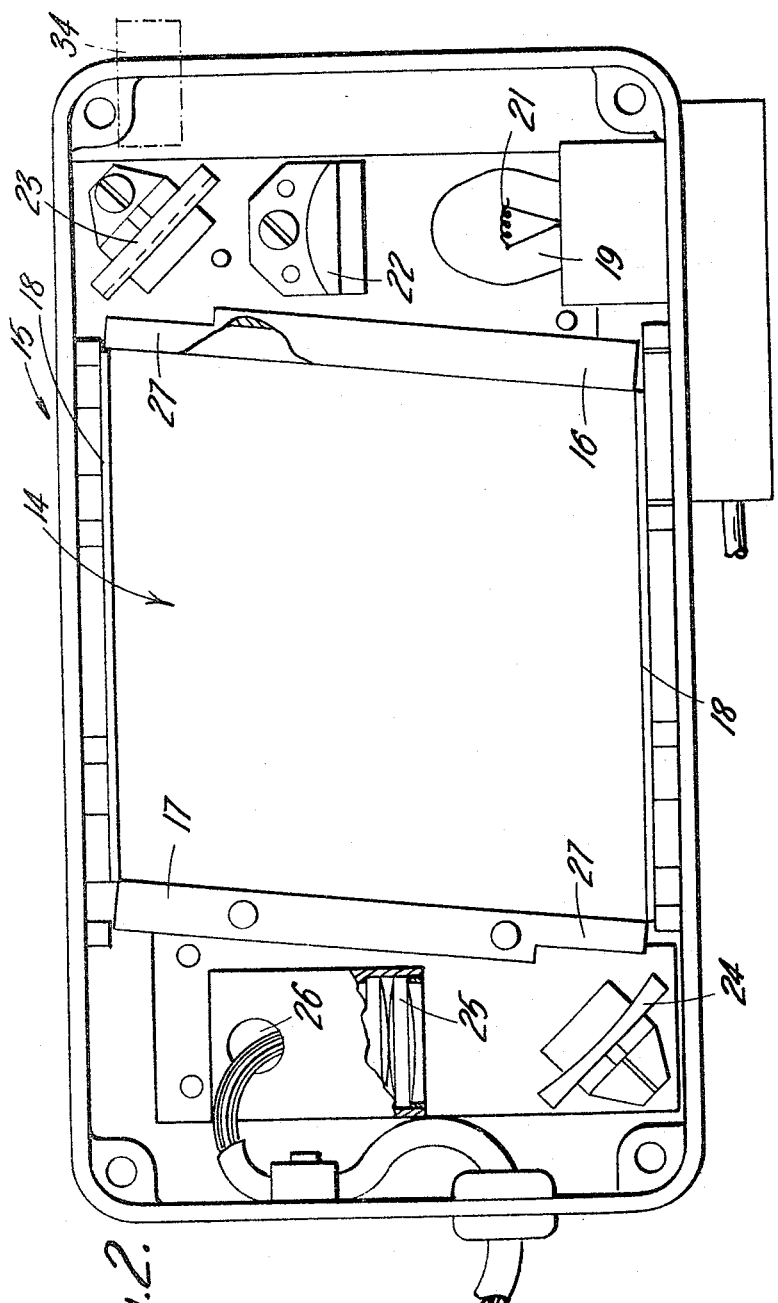
FIGURE 2 is a plan of the detecting device of the apparatus of FIGURE 1 with the lid of the device removed.

In applications where apertures considerably larger than the two-inch rhombus described above are required, a laser 34 may be used in place of the lamp and collimating lens and mirror. The laser is indicated in dotted lines in FIGURE 2. A laser might for example be used to detect passage of objects through a door frame, in which application the plane mirrors may each be constituted by a number of small plane mirrors if single large plane mirrors are not available.

Two devices similar to the detecting devices 15 described above may be used to measure the velocity of an object. The devices are arranged so that the object passes through the aperture 14 of each device in turn, and the output of each device is connected to a timing device 41. Conveniently a change in the output of one device 15 indicating the passage of an object initiates the timing device 41 and a change in the output of the other device 15 stops the timing device. From the separation of the detecting devices 15 and the time registered by the timing device, the mean velocity of the object can be derived.

For added sensitivity two devices may be mounted at right angles around the same aperture. The aperture has mirrors on all four sides, one pair of opposite mirrors forming part of one device and the other pair of the second device. The outputs of the two devices are combined and fed to the counter.

The circuit of FIGURE 4 may be used in conjunction with alternative optical systems. For example light from a lamp may be collimated into a beam as broad as the aperture and passed across the aperture. On the other side of the aperture the beam is collected and focussed on the phototransistor of the circuit of FIGURE 4. The sensitivity of the device is adjusted so that the modulation of the photo-transistor output by the passage of an object is sufficient to cause the trigger circuit to fire.

Since the beam of light is directed across an aperture which is larger than the apertures of usual detectors, the detector can be arranged at a greater distance from the feeding device. Detectors with small apertures must be placed close to the end of a feeding device outlet to ensure that the trajectory of the fed article passes through the aperture. Detectors with large apertures can be placed a substantial distance below the end of the feeding device outlet, so that by the time objects falling consecutively from the outlet reach the detector, they are spaced by a greater distance than their spacing at the outlet. This arrangement increases the resolution of the apparatus and facilitates setting up of the apparatus as the position of the detector aperture is not critical until the variation in trajectory reaches the dimensions of the aperture.

We claim:

1. Apparatus for detecting the passage of an object through an aperture, comprising in combination: a pair of flat reflectors facing each other across the aperture, the reflectors being fixed in parallel planes at right angles to the plane of the aperture; light source means producing a beam of light in the plane of the aperture and inclined to the deflectors at an angle at least as great as the angle whose tangent is twice the separation of the reflectors divided by the beam width; a photoelectric detector disposed to detect the beam of light after the traversal thereof of the aperture by successive reflections at the reflectors, said detector producing a continuous output pulse during the passage of said object through the aperture, said output pulse being followed by a final overshoot pulse as said object finally leaves the plane of the aperture; differentiating means having an input coupled to receive said output and overshoot pulses, and being disposed to provide differentiated signals therefrom; integrating means arranged to integrate said differentiated signals to provide an integrated signal whose value remains below a predetermined threshold in response to the continuous output pulse and exceeds the predetermined threshold in response to the overshoot pulse; and trigger means having an input coupled to receive the integrated signal and comprising pulse generating means for generating a signal output pulse when said integrated signal exceeds said predetermined threshold.

2. Apparatus as set forth in claim 1 in which said differentiating means comprises two resistance capacitance coupled amplifiers in tandem.

3. Apparatus as set forth in claim 2 in which said integrating means comprises a low-pass filter comprising a series resistor and a shunt capacitor.

4. Apparatus as set forth in claim 1, further comprising limiting means for limiting the excursions of said differentiated signals from a datum corresponding to a zero output from said detector.

5. Apparatus as set forth in claim 4 in which said limiting and integrating means comprises a $\pi$-section filter having a series resistor and shunt capacitors.

6. Apparatus as set forth in claim 1 in which said trigger means comprises a Schmitt trigger.

References Cited

UNITED STATES PATENTS

| | | | |
|---|---|---|---|
| 3,025,406 | 3/1962 | Stewart et al. | 250—222 X |
| 3,026,436 | 3/1962 | Hughes | 250—71 |
| 3,058,004 | 10/1962 | Domizi et al. | 250—219 |
| 3,096,443 | 7/1963 | Laycak | 250—219 |
| 3,105,151 | 9/1963 | Nash | 250—219 |
| 3,158,748 | 11/1964 | Laycak et al. | 250—219 |
| 3,235,738 | 2/1966 | Kress et al. | 250—221 |
| 3,260,846 | 7/1966 | Feuer | 250—77 |
| 3,335,285 | 8/1967 | Gally et al. | 250—221 |

RALPH G. NILSON, *Primary Examiner.*

M. A. LEAVITT, *Assistant Examiner.*